United States Patent [19]

Neukomm et al.

[11] Patent Number: 4,647,209
[45] Date of Patent: Mar. 3, 1987

[54] OPTICAL MEASURING INSTRUMENT FOR THE CONTACTLESS MEASUREMENT OF DISTANCES

[75] Inventors: Peter Neukomm, Wettingen; Viktor Augustin, Friedlisberg, both of Switzerland

[73] Assignee: Haenni & Cie AG, Jegenstorf, Switzerland

[21] Appl. No.: 686,828

[22] Filed: Dec. 27, 1984

[30] Foreign Application Priority Data

Feb. 13, 1984 [CH] Switzerland ............... 674/84

[51] Int. Cl.$^4$ ............................................. G01B 11/24
[52] U.S. Cl. .......................................... 356/376; 356/1
[58] Field of Search ......................... 356/1, 375, 376; 250/560, 561

[56] References Cited

U.S. PATENT DOCUMENTS

4,171,160  10/1979  Ernst ................................. 356/375
4,325,639   4/1982  Richter .............................. 356/376
4,553,842  11/1985  Griffin .............................. 356/375

Primary Examiner—R. A. Rosenberger
Assistant Examiner—Crystal D. Cooper
Attorney, Agent, or Firm—Werner W. Kleeman

[57] ABSTRACT

The optical measuring instrument emits a coherent beam of radiation normally to a surface of an object. The scattered radiation generated by the beam of radiation is guided through an optical device to a stationary strip-shaped linear radiation sensor element. The linear radiation sensor element is arranged within a hollow cylinder which is rotatable in an operative position thereof. The hollow cylinder contains a multiple number of slots which traverse the strip-shaped linear radiation sensor element at an acute angle. An evaluation circuit arrangement is connected to the linear radiation sensor element and only generates evaluatable measuring signals during the traversal of one of the slots over a location at the linear radiation sensor element where there occurs a radiation intensity exceeding a predetermined threshold value. Using such measuring instrument it is possible to measure distances with high resolution.

23 Claims, 7 Drawing Figures

OPTICAL MEASURING INSTRUMENT FOR THE CONTACTLESS MEASUREMENT OF DISTANCES

BACKGROUND OF THE INVENTION

The present invention relates to a new and improved optical measuring instrument for contactless measurement of the distance between the measuring instrument and an object.

In its more particular aspects, the present invention relates to a new and improved optical measuring instrument for contactless measurement of the distance between the measuring instrument and an object and comprising a radiation source which emits a coherent beam of radiation normally to the surface of the object. At least one radiation sensor element is mounted at the measuring instrument and receives scattered radiation reflected from the surface of the object which is located within a measuring range of the measuring instrument. An electronic evaluation circuit arrangement is connected to the output of the radiation sensor element. The position of the scattered light on the radiation sensor element which is received thereby through an optical device is a measure of the distance to be measured.

In an optical measuring instrument as known, for example, from U.S. Pat. No. 3,723,003, granted Mar. 27, 1973, the radiation sensor element comprises a series arrangement of a multiple number of photodiodes. The resolution of such optical measuring instrument is limited by the width of the photodiodes. This measuring instrument is unsuited for precision measurements with maximum precision.

A further optical measuring instrument as known, for example, from German Patent Publication No. 3,009,534, comprises a light source, two light sensor elements, each of which contains a multitude of individual sensors, and two optical devices, each of which projects onto the light sensor elements respective sections of two images which have been separately obtained from the object to be measured. In this arrangement there also exists the disadvantage that the resolution is restricted by the width of the individual sensors.

In a laser dimensional comparator as known, for example, from German Pat. No. 2,401,618, a laser light source directs coherent light normally to the surface of a workpiece to be measured in order to generate thereat a laser intensity gradient. An optical device is associated with a photo-detector in such a manner that a pair of images of the laser light-intensity gradient generated on the workpiece is imaged on the surface of the photo-detector. The images of the pair are spaced from each other and are reflected from the workpiece. The surface of the photo-detector is scanned and during the scanning operation two output pulses are generated which are separated in time by a time period which is proportional to the spacing which exists between the two image points of the light spot. The two output pulses switch scaling pulses which are generated by a scaling oscillator to a forward/backward counter. The scale or scaling pulses delivered to the counter are counted in a logic circuit and are compared to a reference value. In this arrangement the scanning frequency limits the resolution. This instrument furthermore has relatively large dimensions and is also economically disadvantageous.

In a further distance measuring instrument as known, for example, from German Pat. No. 2,650,422, a coherent light beam is directed to a measuring surface at a predetermined angle of incidence. The rays reflected from the measuring surface are guided to a receiver which contains a light sensor and which evaluates the angle of reflection for determining the distance. In front of the light sensor of the receiver there is arranged an involute-shaped slot diaphragm or stop which is located on a rotating disk, and thus, constitutes a movable measuring slit. The slot diaphragm or stop runs past a stationarily arranged apertured stop or diaphragm. The intersection point of the circulating slot diaphragm or stop and the stationary apertured stop or diaphragm defines the angular position of the circulating slot diaphragm or stop and thereby the angle between a ray, which is diffusely reflected from the measuring surface, picked up by a lens and passed through the slot diaphragm or stop, and the axis of the optical system and thus the distance under investigation.

In this arrangement the angular position of the circulating slot diaphragm or stop must be determined by counting a graduation at the rim or marginal portion of the disc, whereby the resolution of this instrument is also limited. In order to prevent a distance-dependent optical distortion, the rotating disc must be arranged parallel to the direction of the light ray which impinges on the object to be measured. As a result, the angle of incidence of the coherent light beam on the measuring surface is relatively small. It has been found by experience that false reflections of relatively high intensity occur in such an arrangement and result in a false measurement. The arrangement of the receiver in this instrument is such that all of the false reflections originating from the measuring surface reach the light sensor and result in the generation of a measuring signal. Therefore the uncertainty of the measurement is relatively great. The interfering effects can be counter acted at the light sensor by reducing the sensitivity thereof. Since, however, the intensity of the reflected light ray depends on the material of the measuring surface, the reduction in the sensitivity of the light sensor may have the result that measuring surfaces of poorly reflecting materials either cannot be utilized or require complicated adjusting operations.

SUMMARY OF THE INVENTION

Therefore, with the foregoing in mind, it is a primary object of the present invention to provide a new and improved optical measuring instrument for contactless, high resolution measurement of the distance between the measuring instrument and an object.

A further significant object of the present invention is directed to a new and improved optical measuring instrument for the contactless measurement of the distance between the measuring instrument and an object and which practically renders ineffective any interfering influences and which also is economically advantageous.

Now in order to implement these and still further objects of the invention, which will become more readily apparent as the description proceeds, the measuring instrument of the present development is manifested by the features that, the radiation sensor element comprises a strip-shaped linear radiation sensor element scannable by the scattered radiation reflected from within the measuring region. A hollow cylinder is rotatable in an operative position thereof and encloses the linear radiation sensor element. This hollow cylinder is provided with at least one slot traversing the strip-shaped linear radiation sensor element at an acute angle.

There is also provided an electronic evaluation circuit arrangement which generates measuring signals at the most during the traversal of one slot over a location at the linear radiation sensor element where the highest radiation intensity is measured and exceeds a predetermined threshold value. The electronic evaluation circuit arrangement suppresses the measuring signals during the traversal of the slot over the remaining portions of the linear radiation sensor element.

Advantageously, the strip-shaped linear radiation sensor element is aligned essentially parallel to the axis of the hollow cylinder.

Preferably, the slot traverses or crosses over the strip-shaped linear radiation sensor element at an angle of about 45°.

Four slots can be provided at the hollow cylinder. In its operative position this hollow cylinder may have a rotational speed in the range of 5,000 to 25,000 revolutions per minute.

The strip-shaped linear radiation sensor element has a width which is scannable by the scattered light; the ratio of this scannable width and the width of the slot in the hollow cylinder can have a value in the range of about 0.1 to about 4.

The electronic evaluation circuit arrangement is connected to the two opposite ends of the linear radiation sensor element and may contain a subtracting and summing circuit arrangement for the currents issuing from these two ends of the linear radiation sensor element, a dividing unit series-connected thereto and dividing the difference of the currents by the sum of the currents, and a sample-and-hold unit or circuit. A squaring unit is provided for squaring the sum of the currents and controls a series-connected threshold value detector which determines whether a current limit corresponding to a predetermined limiting value of the radiation intensity is exceeded and which activates the sample-and-hold unit to generate the measuring signals for the time period during which the current limit is exceeded.

A detector which detects at least the start of the passage or traversal of the slot over the linear radiation sensor element can be provided at the hollow cylinder.

The electronic evaluation circuit arrangement may contain a controllable electronic switch having at least two operational modes and by means of which the radiation source and/or the linear radiation sensor element can be turned on and off in such a manner that, during a first scanning mode of operation, the radiation source and the linear radiation sensor element remain turned on at least for a time period required for at least one slot to pass over the linear radiation sensor element and that, during a successive measuring mode of operation, the radiation source and the linear radiation sensor element are only turned on at a traversal location at which a slot passes over such a location at the linear radiation sensor element where the relatively largest radiation intensity has been measured during the preceding scanning mode of operation. The radiation source and/or the linear radiation sensor element are turned off during the slot traversal over the remaining locations of the sensor element.

A connection to the detector may be present during the scanning mode of operation for controlling the turn-on and the turn-off of the electronic switch. In the measuring mode of operation a correlator circuit arrangement and a threshold value detector can be series-connected to the linear radiation sensor element.

In an optical measuring instrument comprising one linear radiation sensor element the electronic switch may be turned on during the scanning mode of operation for a time period required for the passage of at least two slots over the linear radiation sensor element. In the subsequent measuring mode of operation the electronic switch may be turned on only at such traversal or cross over between a slot and the linear radiation sensor element at which there has occurred, during the preceding scanning mode of operation, a maximum correlation between the measured radiation intensities which exceeded a predetermined limiting or threshold value.

In an optical measuring instrument comprising two linear radiation sensor elements, the two linear radiation sensor elements may be offset by 180° in the hollow cylinder. Preferably, the electronic switch is turned on during the measuring mode of operation only at such traversal location between a slot and one of the linear radiation sensor elements at which traversal location, during the preceding scanning mode of operation, a maximum correlation has occurred between the radiation intensities measured at the two linear radiation sensor elements and a predetermined limiting or threshold value has been exceeded.

BRIEF DESCRIPTION OF THE DRAWINGS

The invention will be better understood and objects other than those set forth above, will become apparent when consideration is given to the following detailed description thereof, wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that only enough of the construction of the optical measuring instrument has been shown as needed for those skilled in the art to readily understand the under-lying principles and concepts of the present development, while simplifying the showing of the drawings. Turning attention now specifically to FIG. 1, there has been schematically illustrated a first embodiment of the inventive optical measuring instrument for contactless distance measurements. The optical measuring instrument contains a radiation source 1 which emits radiation of an appropriate wavelength, for instance light in the visible region of the spectrum and which may have the form of a laser. The radiation source 1 emits a coherent radiation beam 2 in a direction normally to a surface 3 of an object 3'. Stationary radiation sensor means are fixedly mounted or arranged within a housing 4 and comprise a strip-shaped linear radiation sensor element 5 which receives scattered radiation 6 which is reflected from the object 3' through a suitable optical device 7, such as a collecting lens. Such strip-shaped linear radiation sensor elements are commercially available components well known in the art, and one such suitable construction is marketed by Sitek Laboratories AB, a Swedish firm located at Goteborg, Sweden, under their commercial designation Type 1L10x1. This linear radiation sensor element 5 is stationarily arranged within a hollow cylinder 8 which is rotatable in its operative position by drive means 11 in a conventional manner. The hollow cylinder 8 defines an axis 8' and the linear radiation sensor element 5 is aligned parallel to this cylinder axis 8'. At least one slot 9, and specifically in the illustrated exemplary embodiment, four slots 9 are cut out in the hollow cylinder 8 and these slots 9 cross over or traverse the linear radiation sensor element 5 at an acute angle 10. For reasons of space the angle 10 is a small angle in the drawing of FIG. 2. Experiments have shown that optimum measuring results can be achieved at an angle 10 of substantially 45°.

Figure 2:
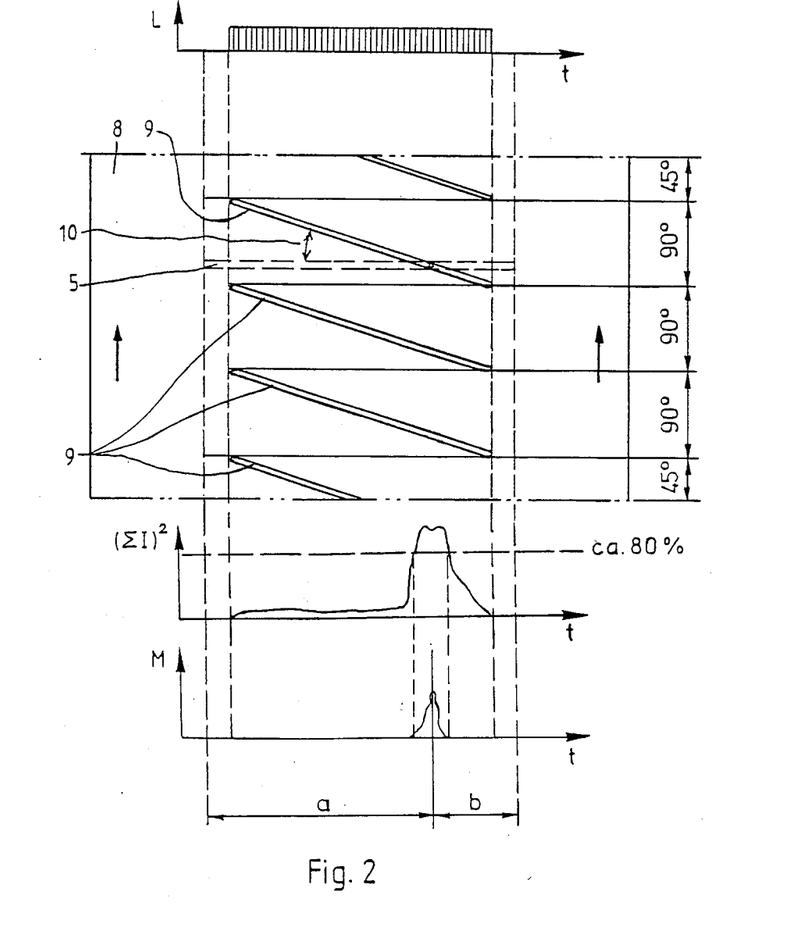
FIG. 2 shows a development of a hollow cylinder provided with four slots and forming a component of the optical measuring instrument shown in FIG. 1; also shown is the radiation intensity of the radiation source as well as the measuring signals as a function of time.

A development of this hollow cylinder 8 containing the four slots 9 is illustrated in FIG. 2.

The hollow cylinder 8 is driven by the drive means or drive motor 11 at a rotational speed in the range of 5,000 to 25,000 revolutions per minute, preferably at a rotational speed of 20,000 revolutions per minute. At this rotational speed the slot 9 requires only 0.75 milliseconds for passing over or traversing the linear radiation sensor element 5.

In order to use the optical measuring instrument described hereinbefore the surface 3 of the object 3' must be positioned within a predetermined measuring region B. The distance to be measured is designated by reference character A in FIG. 1 and the position of the received scattered radiation 6 at the linear radiation sensor element 5 is a measure of the distance A. This position is indicated in FIG. 2 by the spacing a. It can be mathematically deducted in known manner that the spacing a is proportional to the quotient $Ia-Ib/Ia+Ib$. In this quotient Ia designates the current tapped at the "a"-end and Ib represents the current tapped at the "b"-end of the linear radiation sensor element 5.

During rotation of the hollow cylinder 8 the slots 9 pass over the linear radiation sensor element 5 and ensure that only one single location at the linear radiation sensor element 5 is accessible for scattered radiation 6 at each moment of time when an object 3' is present in the measuring region B. The strip-shaped linear radiation sensor element 5 has a predetermined width and is scannable or swept by the scattered radiation 6, and the slot 9 in the hollow cylinder 8 also has a predetermined width. Advantageously, the ratio between the scannable width of the linear radiation sensor element 5 and the width of the slot 9 in the hollow cylinder 8 is in the range of about 0.1 to about 4. In the presently described example the ratio has a value of about 1.5. Without using the rotating hollow cylinder 8 which is provided with the slots 9 extending at an inclination, the determination of the distance a on the basis of the highest radiation intensity would not be possible, at least not with the required precision, because interfering radiation which impinges on the linear radiation sensor element 5 at locations which are outside the spacing a, despite their lower intensity, would disproportionately strongly affect the measuring operation. In other words, the hollow cylinder 8 therefore shields the major portion of the linear radiation sensor element 5 from such interfering radiation, exposing only a minor, currently effective, measuring portion defined by the above-mentioned ratio to incoming measurement radiation and possible but negligibly little interference radiation.

Figure 3:
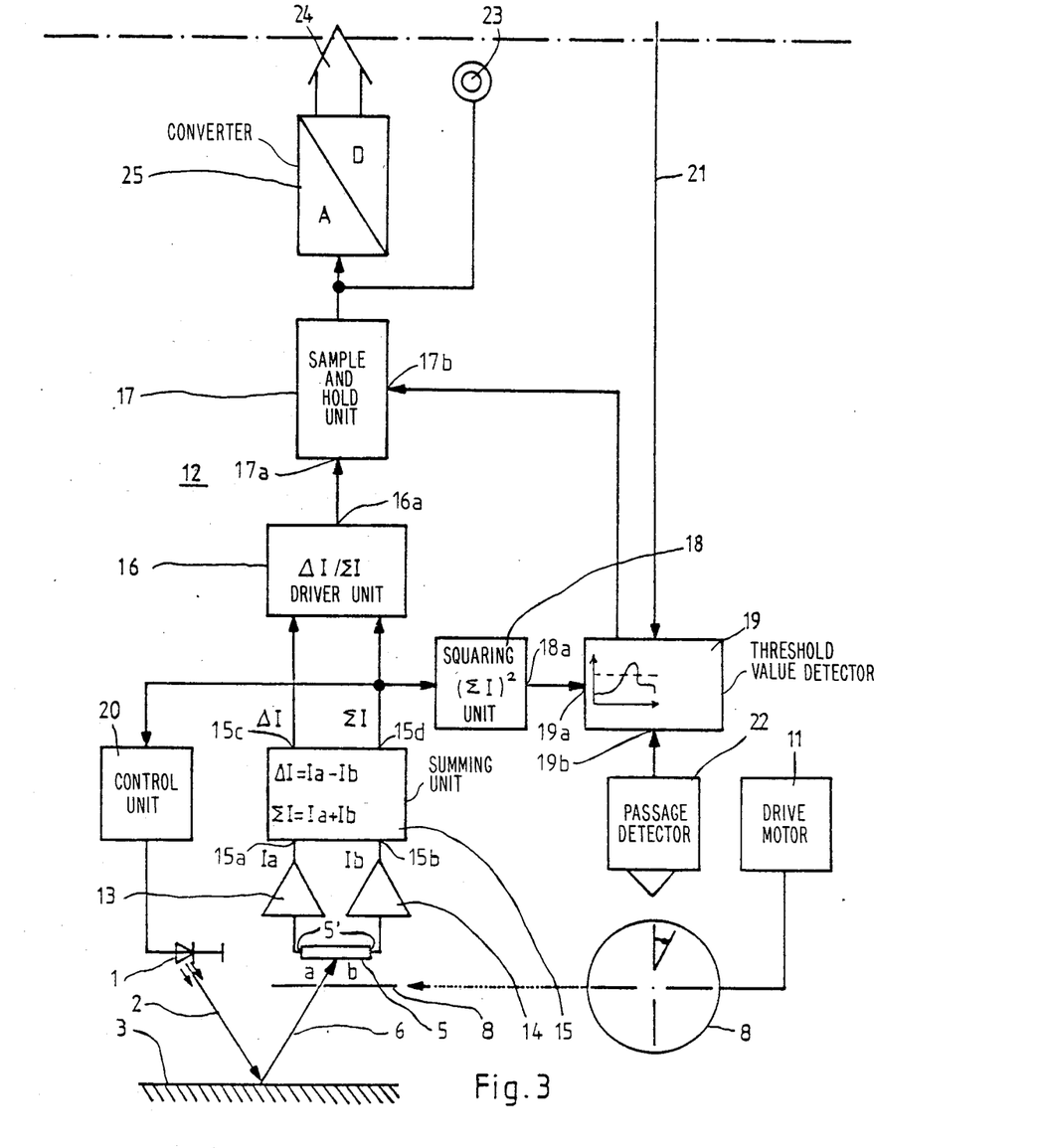
FIG. 3 is a block diagram of an evaluation circuit arrangement in the optical measuring instrument shown in FIG. 1.

The laser radiation source 1 continuously emits a pulse-modulated coherent radiation beam 2 in a direction normally to the surface 3 of the object 3' at an intensity L as indicated in FIG. 2 in which the time is designated by t. The radiation beam 2 is merely schematically shown in FIG. 3 extending at an inclination with respect to the surface 3. The scattered radiation 6, as shown in FIG. 3, is received at the linear radiation sensor element 5 from the surface 3 through one of the slots 9 provided in the hollow cylinder 8. Also in this case the hollow cylinder 8 and the drive motor 11 are only schematically illustrated. The laser radiation source 1 and output means 5' of the linear radiation sensor element 5 are connected to an evaluation circuit arrangement 12 which is illustrated in FIG. 3 in block circuit diagram. The currents Ia and Ib are conducted from output means 5' at the "a"- and "b"-ends of the linear radiation sensor element 5 through related preamplifiers 13 and 14 and are supplied to related inputs 15a and 15b of a subtracting and summing circuit arrangement 15. A divider unit 16 is connected on its input side to the outputs 15c and 15d of the subtracting and summing circuit arrangement 15 and continuously derives from the quotient $Ia-Ib$ divided by $Ia+Ib$ a signal which corresponds to the spacing a at the linear radiation sensor element 5. This signal is fed to a first input 17a of a sample-and-hold unit or circuit 17.

A squaring unit 18 is connected on its input side to the output 15d of the subtracting and summing circuit arrangement 15 and generates at an output 18a a signal which corresponds to the square of the sum of the two currents, i.e. to $(Ia+Ib)^2$. The output 18a of the squaring unit 18 is connected to a first input 19a of a threshold value detector 19. The squared sum of the currents Ia and Ib renders discernible in the threshold value detector 19 current magnitudes which exceed a current limiting or threshold value which corresponds to a predetermined threshold value of the radiation intensity and which is assumed to be about 80% in FIG. 2. In this manner there can be detected the traversal which exists between one of the slots 9 and that location at the linear radiation sensor element 5 at which there occurs the maximum radiation intensity in excess of the predetermined threshold value. As soon as the current limiting value of about 80% is reached in the threshold value detector 19, a signal is generated on the output side thereof and conducted to a second input 17b of the sample-and-hold unit 17 in order to activate the same for generating measuring signals M as illustrated in FIG. 2.

These measuring signals M are generated only for a period of time during which the current magnitudes in the threshold value detector 19 exceed the current limiting threshold value set at about 80%. During the traversal of the slots 9 over the remaining cross-over regions or locations of such slots 9 with the linear radiation sensor element 5 the generation of the measuring signals M is suppressed. Due to the fact that measuring signals or measuring values M are generated only within a small region encompassing the location at which the maximum radiation intensity exists at the linear radiation sensor element 5, the exact position of the maximum of the measuring value can be determined or recognized and the intended high resolution of the measuring instrument can be achieved.

The current sum also affects a control unit 20 of the laser radiation source 1 and thereby the correct radiation intensity is automatically adjusted.

The threshold value detector 19 is controlled via a clock line 21 of the system and via a passage detector 22 which scans the hollow cylinder 8 and determines the start of each passage or traversal of a slot 9 over the linear radiation sensor element 5. Such control enables synchronization of the movement of the hollow cylinder 8 with further units such as, for example, a microprocessor not particularly illustrated in the drawings. Such further units may be connected to an analog output 23 or to an output 24 of an A/D-converter 25.

Figure 4:
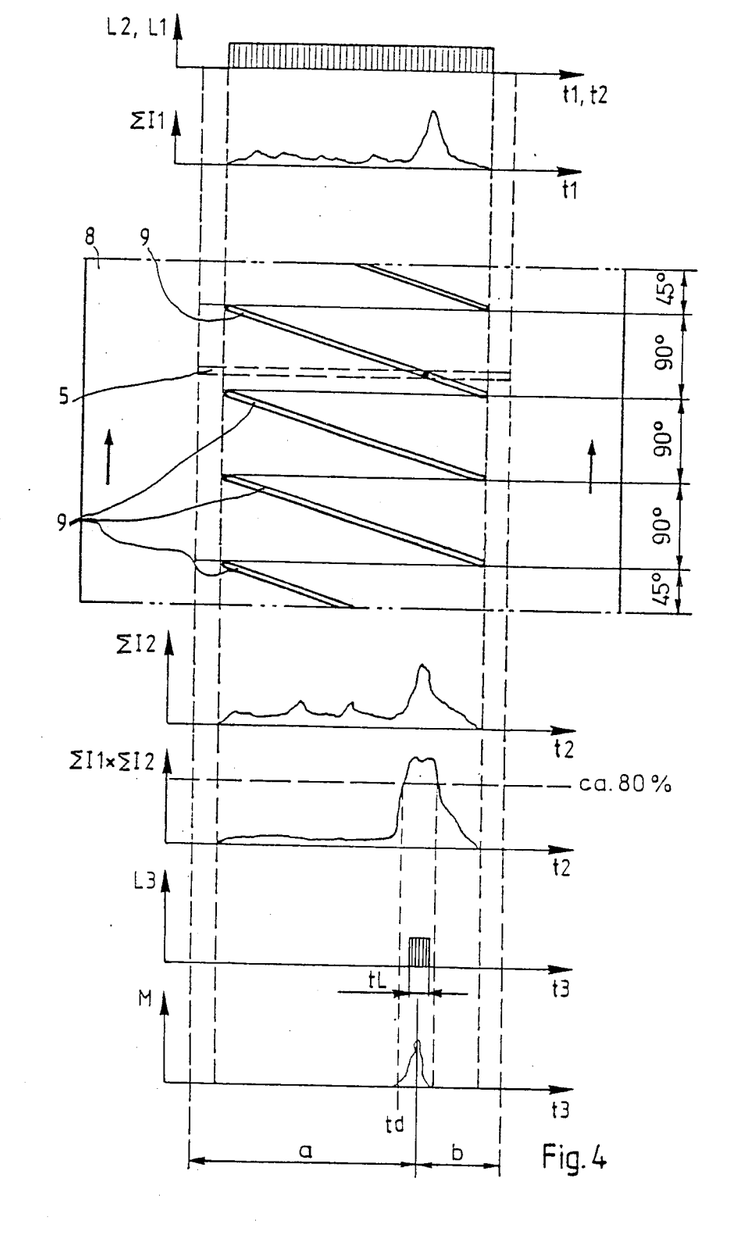
FIG. 4 shows the development of a hollow cylinder provided with four slots and forming a component of the optical measuring instrument shown in FIG. 1; also shown are the radiation intensity of the radiation source and the measuring signals as a function of time in a modified electronic circuit arrangement.
Figure 5:
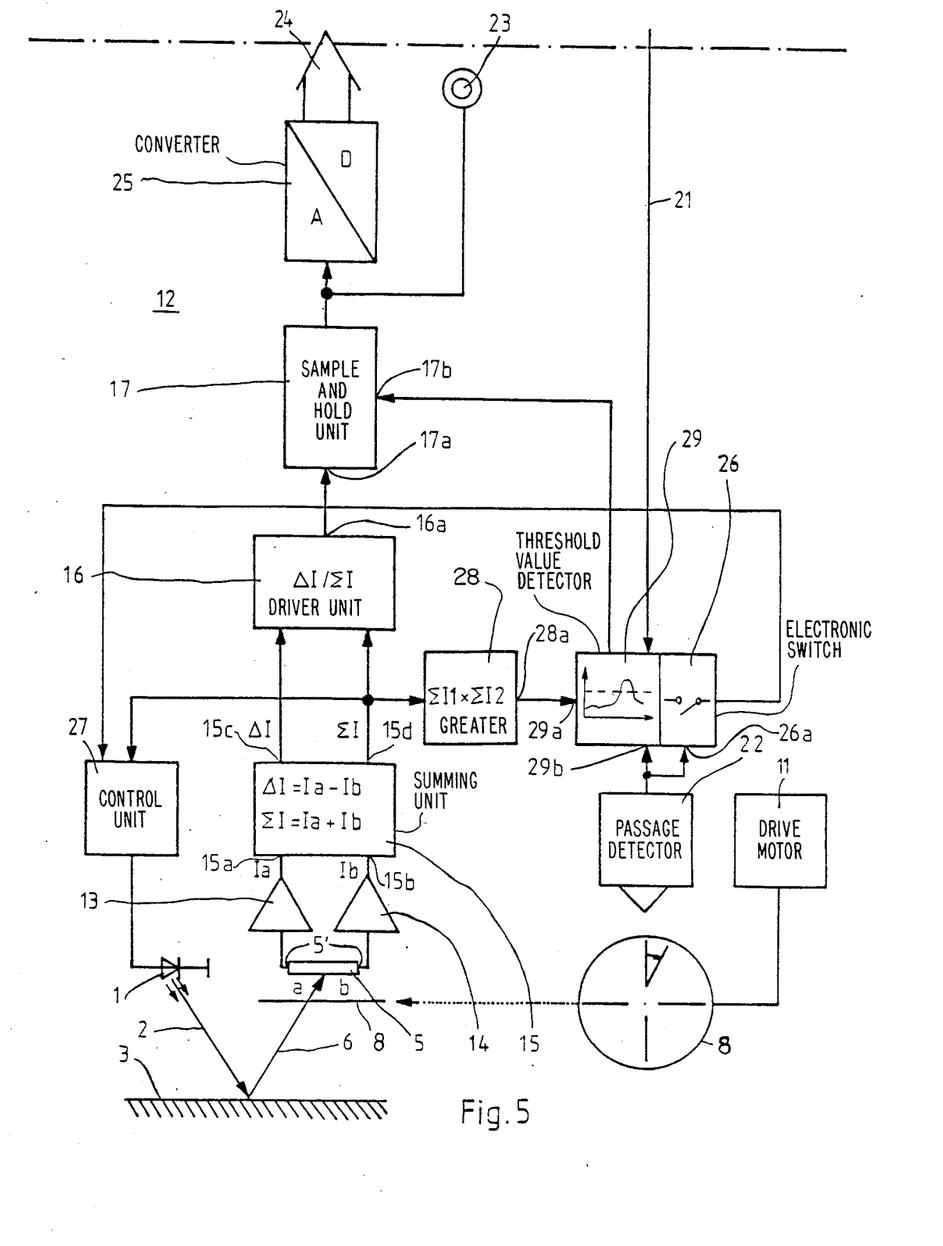
FIG. 5 is a block circuit diagram of the modified evaluation circuit arrangement.

Instead of squaring the current sum values which are generated during the passing-over or traversal of one of the slots 9 over the linear radiation sensor element 5 in the squaring unit 18, there can also be multiplied current values which were successively obtained in two successively conducted measurements at the same location of the linear radiation sensor element 5. Using such cross-correlation, interferences which do not occur at the same time or not at the same position of the linear radiation sensor element 5 can be eliminated in a simple manner. FIG. 4 shows the course of events with respect to time and FIG. 5 shows the associated block circuit diagram of a correspondingly modified electronic evaluation circuit arrangement. Members or components shown in FIG. 5 and identical with corresponding members or components shown in FIG. 3 are conveniently provided with the same reference characters.

The passage detector 22 detects the start of the passing-over or traversal of one slot 9 over the linear radiation sensor element 5 and turns on an electronic switch 26 via a control input 26a thereof for the time period required for the passage of two slots 9 over the linear radiation sensor element 5. The controllable electronic switch 26 has at least two modes of operation and is operatively connected to the radiation source 1 as shown in the illustrated exemplary embodiment. Instead of this arrangement the controllable electronic switch 26 may be operatively connected either to the linear radiation sensor element 5 or to both the radiation source 1 and to the linear radiation sensor element 5. During this first scanning mode of operation the electronic switch 26 activates the control unit 27 of the laser radiation source 1, and thus, causes coherent radiation beams 2 of the intensities L1 and L2 to be emitted during related times t1 and t2 and during the aforementioned two passages or traversals. The sum currents formed in the subtracting and summing circuit arrangement 15 during the two passages or traversals are supplied to a correlator circuit arrangement 28 which is equipped with a storage function.

The correlator circuit arrangement 28 multiplies the two sum current values which have been measured at the same location of the linear radiation sensor element 5 and further supplies these values to a threshold value detector 29. The threshold value detector 29 determines the moment of time td when the predetermined threshold value is exceeded, switches the electronic switch 26 into the measuring mode of operation for a time period which is somewhat shorter than the time period during which the threshold value is exceeded, i.e. for a time period which is somewhat shorter than the time period required for the traversal of one slot 9 in the hollow cylinder 8 over the location at the linear radiation sensor element 5 at which a maximum correlation has occurred between the radiation intensities measured during the preceding scanning mode of operation. During the measuring mode of operation a coherent radiation beam 2 of the intensity L3 is generated at the laser radiation source 1 by means of the control unit 27 for a period of time tL shorter than and lying within the period during which the threshold value is exceeded. The commencement td of the time period tL is determined in the scanning mode of operation by the threshold value detector 29 in relation to, and in particular subsequent to, the instant at which the threshold value is first exceeded. The duration of the time period tL is determined in the measuring mode of operation by the active time of the electronic switch 26 to terminate before the threshold value ceases to be exceeded. For the period of time during which the threshold value is exceeded, the sample-and-hold unit 17 is activated and measuring signals or measuring pulses are generated.

As illustrated in FIG. 3, the passage detector 22 is also provided in the evaluation circuit arrangement 12 and is connected to a second input 19b of the threshold detector 19. Also in this embodiment the electronic switch 26 can be connected to the evaluation circuit arrangement 12 in an analogous manner in order to define a scanning mode and a measuring mode of its operation.

Figure 6:
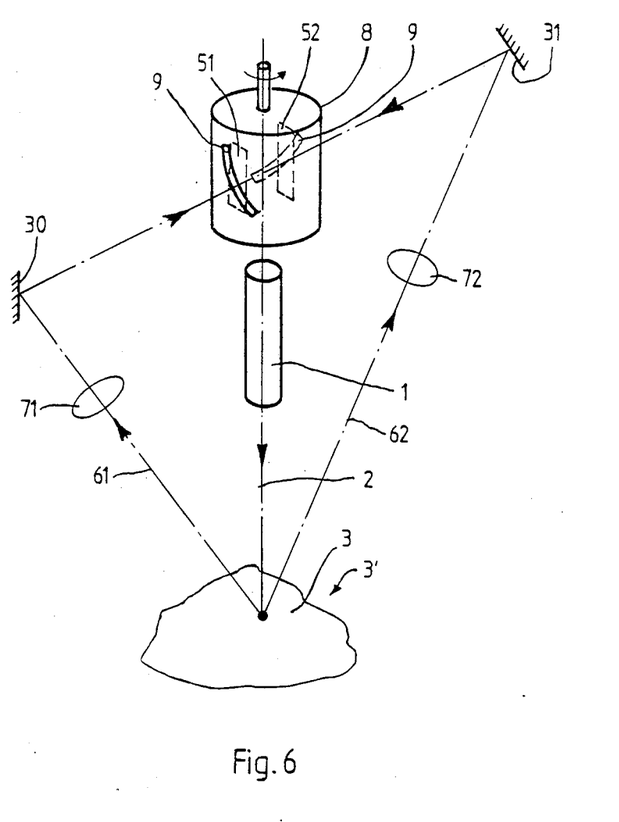
FIG. 6 is a schematic representation of a second embodiment of the optical measuring instrument according to the invention containing two radiation beams and two linear radiation sensor elements.

In the arrangement as illustrated in FIG. 6 which shows a second embodiment of the inventive optical measuring instrument the scattered radiations 61, 62, which are generated by a coherent radiation beam 2 directed normal or perpendicular to the surface 3 of the object 3' from a laser radiation source 1, are directed towards two related strip-shaped linear radiation sensor elements 51, 52 through two related optical devices 71, 72 and by means of two related mirrors 30, 31. The linear radiation sensor elements 51, 52 are arranged at an offset of about 180° in the hollow cylinder 8 which is rotatable in its operative position and which is here provided with slots 9 extending at an inclination.

Figure 1:
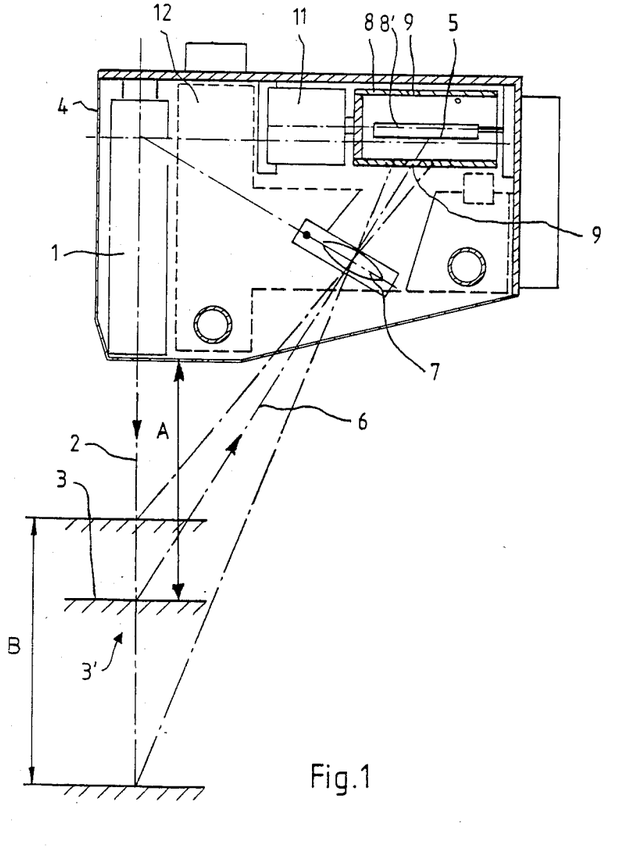
FIG. 1 is a schematic illustration of a first embodiment of the optical measuring instrument according to the invention.
Figure 7:
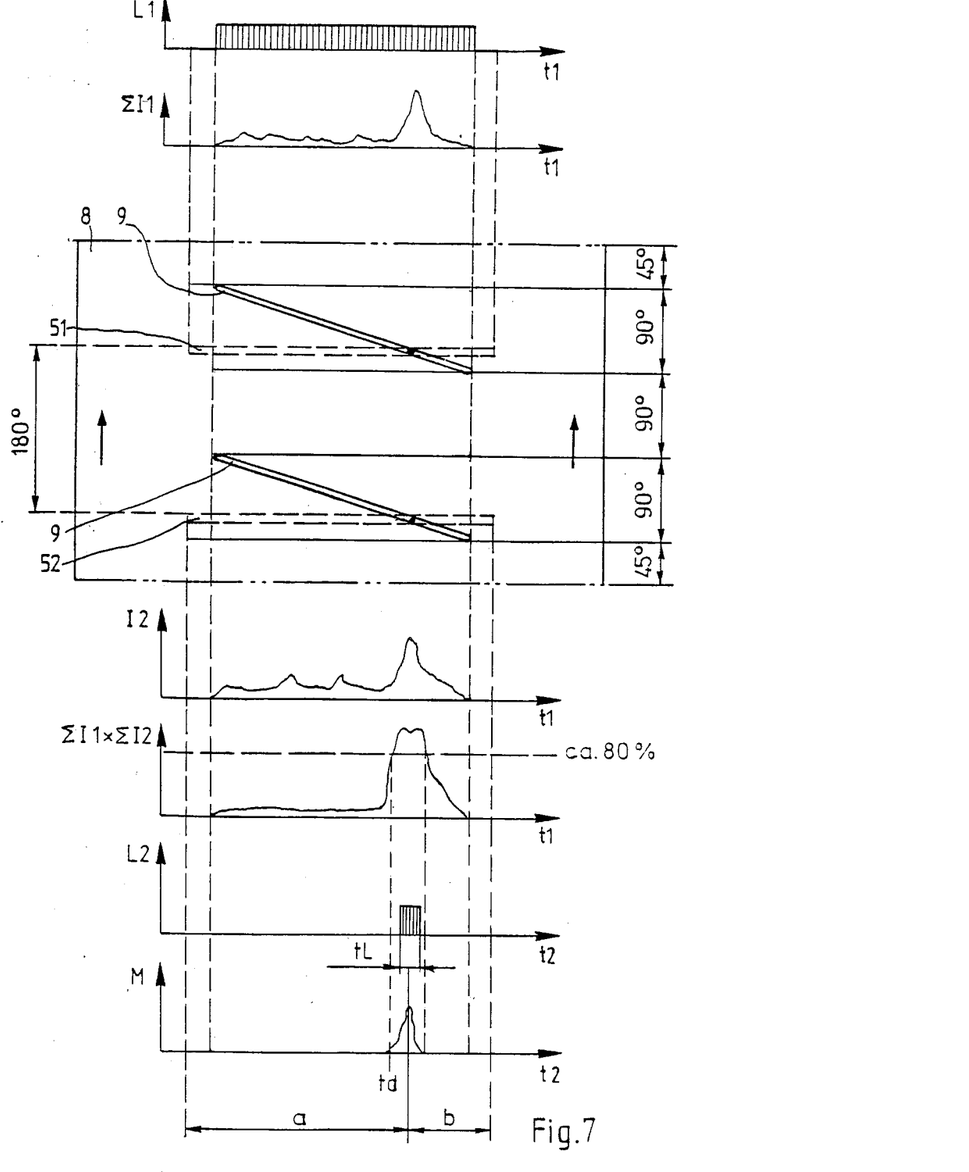
FIG. 7 shows the development of a hollow cylinder provided with two slots and forming a component in the optical measuring instrument shown in FIG. 6; also shown are the radiation intensity of the radiation source and the measuring signals as a function of time.

The function of this optical measuring instrument is basically similar to the function of the optical measuring instrument already described with reference to FIG. 1. The evaluation circuit arrangement is basically the same as described hereinbefore with reference to FIG. 5. Related subtracting and summing circuit arrangements 15 and divider units 16 are associated with the two linear radiation sensor elements 51, 52. A mean value is formed from the two measuring signals in the sample-and-hold unit or circuit 17. The two current sums shown in FIG. 7 and derived from the two subtracting and summing circuit arrangements 15 are supplied to a common correlator circuit arrangement 28. The remaining circuit components and elements are identically structured and function in the same manner as described hereinbefore with reference to FIG. 5.

In this exemplary embodiment the scattered radiations 61 and 62 are received from two different directions. By correlating the current values which occur at the same time and which are proportional to the scattered radiations 61 and 62, the interferences which negatively affect the measurement can be eliminated in a relatively simple manner. The combination of this system which is known as such with the use of the linear radiation sensor elements 51, 52, which are connected to the aforementioned evaluation circuit arrangement, and of the hollow cylinder 8, which encloses the two linear radiation sensor elements 51, 52, and which hollow cylinder rotates in its operative position and which is provided with the two slots 9, permits a continuous distance measurement at high resolution.

While there are shown and described present preferred embodiments of the invention, it is to be distinctly understood that the invention is not limited thereto, but may be otherwise variously embodied and practiced within the scope of the following claims. Accordingly,

What we claim is:

1. An optical measuring instrument for contactless measurement of a distance between the measuring instrument and a surface of an object which is located in a predetermined measuring region of the measuring instrument, said measuring instrument comprising:

a radiation source emitting a coherent beam of radiation which is directed substantially normally to the surface of said object;

at least one radiation sensor means fixedly mounted in the measuring instrument and receiving scattered radiation reflected from the surface of said object when the object is located within the predetermined measuring region of the measuring instrument;

an optical device arranged between said surface of said object and said at least one radiation sensor means;

said at least one radiation sensor means comprising at least one strip-shaped linear radiation sensor element scannable by the scattered radiation reflected from the surface of said object when the object is located within said predetermined measuring region of said measuring instrument;

a hollow cylinder enclosing said at least one linear radiation sensor element and having an axis;

means for rotating said hollow cylinder about said axis in an operative position thereof;

said hollow cylinder containing at least one slot which is inclined relative to said at least one linear radiation sensor element and which traverses said at least one linear radiation sensor element at an acute angle while said hollow cylinder rotates about its axis;

said at least one linear radiation sensor element receiving said scattered radiation reflected from the surface of said object, when the object is located within said measuring region of the measuring instrument at a predetermined distance therefrom, through said optical device at a location of the at least one linear radiation sensor element which is a measure of the distance of the object from the measuring instrument;

said at least one linear radiation sensor element having output means;

an electronic evaluation circuit arrangement connected to said output means of said at least one linear radiation sensor element;

said electronic evaluation circuit arrangement only generating measuring signals during the traversal of said at least one slot in said hollow cylinder over said location at said at least one linear radiation sensor element, said location constituting the location where a maximum radiation intensity is measured and which maximum radiation intensity exceeds a predetermined threshold value; and said electronic circuit arrangement suppressing said measuring signals during the traversal of said at least one slot in said hollow cylinder over remaining portions of said at least one linear radiation sensor element.

2. The measuring instrument as defined in claim 1, wherein:
   said at least one strip-shaped linear radiation sensor element is aligned substantially parallel to said axis of said hollow cylinder.

3. The measuring instrument as defined in claim 1, wherein:
   said at least one slot in said hollow cylinder traverses said at least one linear radiation sensor element at an angle of about 45°.

4. The measuring instrument as defined in claim 1, wherein:
   said at least one slot in said hollow cylinder includes three additional such slots and thus constitute four slots.

5. The measuring instrument as defined in claim 1, wherein:
   said hollow cylinder, in said operative position thereof, being rotatable about its axis at a rotational speed in the range of about 5,000 to about 25,000 revolutions per minute.

6. The measuring instrument as defined in claim 1, wherein:
   said at least one strip-shaped linear radiation sensor element defines a predetermined width which is scannable by said scattered radiation reflected from the surface of said object;
   said at least one slot in said hollow cylinder defines a predetermined width; and
   the ratio of said scannable predetermined width of said at least one linear radiation sensor element and of said predetermined width of said at least one slot in said hollow cylinder having a value in the range of about 0.1 to about 4.

7. The measuring instrument as defined in claim 1, wherein:
   said at least one linear radiation sensor element has two ends and generates a respective current at each of said two ends; and
   said electronic circuit arrangement connected to said output means at said two ends of said at least one linear radiation sensor element comprising:
   a subtracting and summing circuit arrangement connected at two related inputs thereof to said two ends of said at least one linear radiation sensor element and generating at two outputs thereof signals respectively representing the difference and the sum of the two currents generated at said two ends of said at least one linear radiation sensor element;
   a divider unit connected on its input side to said two outputs of said subtracting and summing circuit arrangement and generating at an output thereof a signal representing the quotient of the difference of said two currents divided by the sum of said two currents generated at the related outputs of said subtracting and summing circuit arrangement;

a sample-and-hold unit generating said measuring signals and having a first input connected to the output of said divider unit;

a squaring unit connected on its input side to one of the two outputs of said subtracting and summing circuit arrangement at which a signal representative of the sum of said two currents is generated;

said squaring unit generating at an output thereof a signal representing the square of said sum signal received at the input side thereof;

a threshold value detector connected at a first input thereof to the output of said squaring unit and defining a current threshold value corresponding to said predetermined threshold value of the radiation intensity;

said sample-and-hold unit having a second input; and said threshold value detector being connected on the output side thereof to said second input of said sample-and-hold unit in order to activate the same for generating said measuring signals for a time period during which said current threshold value detector is exceeded.

8. The measuring instrument as defined in claim 7, further including:

a passage detector provided at said hollow cylinder;

said threshold value detector having a second input;

said passage detector being connected on the output side thereof to said second input of said threshold value detector; and said passage detector detecting at least the start of said traversal of said at least one slot in said hollow cylinder over said at least one linear radiation sensor element.

9. The measuring instrument as defined in claim 7, further including:

a controllable electronic switch having at least two modes of operation and being connected to said electronic circuit arrangement;

said electronic switch being operatively connected to said radiation source in order to turn off and turn on said radiation source;

said electronic switch defining a first operational state and a second operational state of the measuring instrument;

said first operational state representing a scanning mode of operation during which said radiation source and said at least one linear radiation sensor element remain turned on at least for a time period required for said traversal of said at least one slot in said hollow cylinder over said at least one linear radiation sensor element;

said second operational state representing a measuring mode of operation following said scanning mode of operation and during which said radiation source and said at least one linear radiation sensor element are turned on only for a time period required for the traversal of said at least one slot in said hollow cylinder over said location at the at least one linear radiation sensor element where said maximum radiation intensity has been measured during the preceding scanning mode of operation; and said radiation source being turned off during said measuring mode of operation and during said traversal of said at least one slot in said hollow cylinder over the remaining portions of said at least one linear radiation sensor element.

10. The measuring instrument as defined in claim 7, further including:

a controllable electronic switch having at least two modes of operation and being connected to said electronic circuit arrangement;

said electronic switch being operatively connected to said at least one linear radiation sensor element in order to turn off and turn on said at least one linear radiation sensor element;

said electronic switch defining a first operational state and a second operational state of the measuring instrument;

said first operational state representing a scanning mode of operation during which said radiation source and said at least one linear radiation sensor element remain turned on at least for a time period required for said traversal of said at least one slot in said hollow cylinder over said at least one linear radiation sensor element;

said second operational state representing a measuring mode of operation following said scanning mode of operation and during which said radiation source and said at least one linear radiation sensor element are turned on only for a time period required for the traversal of the at least one slot in said hollow cylinder over said location at the at least one linear radiation sensor element where said maximum radiation intensity has been measured during the preceding scanning mode of operation; and said linear radiation sensor element being turned off during said measuring mode of operation and during said traversal of said at least one slot in said hollow cylinder over the remaining portions of said at least one linear radiation sensor element.

11. The measuring instrument as defined in claim 7, further including:

a controllable electronic switch having at least two modes of operation and being connected to said electronic circuit arrangement;

said electronic switch being operatively connected to said radiation source and to said at least one linear radiation sensor element in order to turn off and turn on said radiation source and said at least one linear radiation sensor element;

said electronic switch defining a first operational state and a second operational state of the measuring instrument;

said first operational state representing a scanning mode of operation during which said radiation source and said at least one linear radiation sensor element remain turned on at least for a time period required for said traversal of said at least one slot in said hollow cylinder over said at least one linear radiation sensor element;

said second operational state representing a measuring mode of operation following said scanning mode of operation and during which said radiation source and said at least one linear radiation sensor element are turned on only for a time period required for the traversal of said at least one slot in said hollow cylinder over said location where said maximum radiation intensity has been measured during the preceding scanning mode of operation; and said radiation source and said at least one linear radiation sensor element being turned off during said measuring mode of operation and during said traversal of said at least one slot in said hollow cylinder over the remaining portions of said at least one linear radiation sensor element.

12. The measuring instrument as defined in claim 9, further including:
a passage detector provided at said hollow cylinder;
said threshold value detector having a second input;
said passage detector being connected on the output side thereof to said second input of said threshold value detector;
said passage detector detecting at least the start of said traversal of said at least one slot in said hollow cylinder over said at least one linear radiation sensor element;
said passage detector being further connected on the output side thereof, during said scanning mode of operation, to a control input of said electronic switch in order to turn on and turn off said electronic switch; and
a correlator circuit arrangement replacing said squaring unit in said electronic circuit arrangement and connected, during said measuring mode of operation, on its input side to the output of said subtracting and scanning circuit arrangement and on its output side to the input of said threshold value detector.

13. The measuring instrument as defined in claim 12, wherein:
said hollow cylinder comprises a multiple number of said slots;
said electronic switch being turned on during said scanning mode of operation at least for a time period required for the traversal of at least two of said multiple number of slots in said hollow cylinder over said at least one linear radiation sensor element; and
said electronic switch being turned on during said measuring mode of operation following said scanning mode of operation only at a traversal of one of said multiple number of slots in said hollow cylinder over said at least one linear radiation sensor element and at which traversal, during the preceding scanning mode of operation, a maximum correlation has occurred between the measured radiation intensities in excess of said predetermined threshold value of the radiation intensity.

14. The measuring instrument as defined in claim 12, wherein:
said at least one linear radiation sensor element includes one additional linear radiation sensor element and thus constitutes two linear radiation sensor elements; and
said two linear radiation sensor elements are arranged in said hollow cylinder at an angular offset of about 180°.

15. The measuring instrument as defined in claim 14, wherein:
said electronic switch is turned on during said measuring mode of operation only at a traversal of said at least one slot in said hollow cylinder over one of said two linear radiation sensor elements and at which traversal, during the preceding scanning mode of operation, a maximum correlation has occurred between the radiation intensities measured at said two linear radiation sensor elements in excess of said predetermined threshold value.

16. The measuring instrument as defined in claim 10, further including:
a passage detector provided at said hollow cylinder;
said threshold value detector having a second input;
said passage detector being connected on the output side thereof to said second input of said threshold value detector;
said passage detector detecting at least the start of said traversal of said at least one slot in said hollow cylinder over said at least one linear radiation sensor element;
said passage detector being further connected on the output side thereof, during said scanning mode of operation, to a control input of said electronic switch in order to turn on and turn off said electronic switch; and
a correlator circuit arrangement replacing said squaring unit in said electronic circuit arrangement and connected, during said measuring mode of operation, on its input side to the output of said subtracting and scanning circuit arrangement and on its output side to the input of said threshold value detector.

17. The measuring instrument as defined in claim 16, wherein:
said hollow cylinder comprises a multiple number of said slots;
said electronic switch being turned on during said scanning mode of operation at least for a time period required for the traversal of at least two of said multiple number of slots in said hollow cylinder over said at least one linear radiation sensor element; and
said electronic switch being turned on during said measuring mode of operation following said scanning mode of operation only at a traversal of one of said multiple number of slots in said hollow cylinder with said at least one linear radiation sensor element and at which traversal, during the preceding scanning mode of operation, a maximum correlation has occurred between the measured radiation intensities in excess of said predetermined threshold value of the radiation intensity.

18. The measuring instrument as defined in claim 16, wherein:
said at least one linear radiation sensor element includes one additional linear radiation sensor element and thus constitutes two linear radiation sensor elements; and
said two linear radiation sensor elements are arranged in said hollow cylinder at an angular offset of about 180°.

19. The measuring instrument as defined in claim 18, wherein:
said electronic switch is turned on during said measuring mode of operation only at a traversal of said at least one slot in said hollow cylinder over said two linear radiation sensor elements and at which traversal, during the preceding scanning mode of operation, a maximum correlation has occurred between the radiation intensities measured at said two linear radiation sensor elements in excess of said predetermined threshold value of the radiation intensity.

20. The measuring instrument as defined in claim 11, further including:
a passage detector provided at said hollow cylinder;
said threshold value detector having a second input;
said passage detector being connected on the output side thereof to said second input of said threshold value detector;
said passage detector detecting at least the start of said traversal of said at least one slot in said hollow cylinder over said at least one linear radiation sensor element;
said passage detector being further connected on the output side thereof during said scanning mode of operation, to a control input of said electronic switch in order to turn on and turn off said electronic switch; and
a correlator circuit arrangement replacing said squaring unit in said electronic circuit arrangement and connected, during said measuring mode of operation, on its input side to the output of said subtracting and scanning circuit arrangement and on its output side to the input of said threshold value detector.

21. The measuring instrument as defined in claim 20, wherein:
said hollow cylinder comprises a multiple number of said slots;
said electronic switch being turned on during said scanning mode of operation at least for a time period required for the traversal of at least two of said multiple number of slots in said hollow cylinder over said at least one linear radiation sensor element; and
said electronic switch being turned on during said measuring mode of operation following said scanning mode of operation only at a traversal of one of said multiple number of slots in said hollow cylinder over said at least one linear radiation sensor element and at which traversal, during the preceding scanning mode of operation, a maximum correlation has occurred between the measured radiation intensities in excess of said predetermined threshold value of the radiation intensity.

22. The measuring instrument as defined in claim 20, wherein:
said at least one linear radiation sensor element includes one additional linear radiation sensor element and thus constitutes two linear radiation sensor elements; and
said two linear radiation sensor elements are arranged in said hollow cylinder at an angular offset of about 180°.

23. The measuring instrument as defined in claim 22, wherein:
said electronic switch is turned on during said measuring mode of operation only at a traversal of said at least one slot in said hollow cylinder over one of said two linear radiation sensor elements and at which traversal, during the preceding scanning mode of operation, a maximum correlation has occurred between the radiation intensities measured at said two linear radiation sensor elements in excess of said predetermined threshold value of the radiation intensity.

* * * * *